(12) United States Patent
Griffith

(10) Patent No.: US 7,631,271 B2
(45) Date of Patent: Dec. 8, 2009

(54) TOUCH SCREEN USER INTERFACE WITH MULTI-TEXT FIELD DISPLAY

(75) Inventor: Jeremy H. L. Griffith, East Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 314 days.

(21) Appl. No.: 11/304,655

(22) Filed: Dec. 16, 2005

(65) Prior Publication Data

US 2007/0143703 A1    Jun. 21, 2007

(51) Int. Cl.
*G06F 3/00* (2006.01)
(52) U.S. Cl. .................. 715/780; 715/702; 715/815; 715/800; 715/828
(58) Field of Classification Search .......... 715/702, 715/780, 815, 828, 503, 506, 505, 507, 508
See application file for complete search history.

(56) References Cited

U.S. PATENT DOCUMENTS

| | | | | |
|---|---|---|---|---|
| 5,119,079 A | * | 6/1992 | Hube et al. | 715/823 |
| 5,450,538 A | * | 9/1995 | Glaser et al. | 715/508 |
| 5,565,888 A | * | 10/1996 | Selker | 715/823 |
| 6,256,649 B1 | * | 7/2001 | Mackinlay et al. | 715/503 |
| 6,781,610 B2 | * | 8/2004 | Os et al. | 715/764 |
| 7,107,532 B1 | * | 9/2006 | Billmaier et al. | 715/720 |
| 2003/0035011 A1 | * | 2/2003 | Lee et al. | 345/780 |
| 2004/0008228 A1 | * | 1/2004 | Smith | 345/780 |
| 2004/0160463 A1 | * | 8/2004 | Battles et al. | 345/814 |
| 2004/0165009 A1 | * | 8/2004 | Blakely et al. | 345/801 |
| 2004/0181749 A1 | * | 9/2004 | Chellapilla et al. | 715/505 |
| 2004/0210853 A1 | * | 10/2004 | Detter | 715/864 |
| 2004/0212547 A1 | * | 10/2004 | Adamski et al. | 345/1.1 |
| 2005/0022136 A1 | * | 1/2005 | Hatscher et al. | 715/798 |
| 2006/0123360 A1 | * | 6/2006 | Anwar et al. | 715/810 |
| 2007/0130532 A1 | * | 6/2007 | Fuller et al. | 715/764 |

* cited by examiner

*Primary Examiner*—Ryan F Pitaro
(74) *Attorney, Agent, or Firm*—MH2 Technology Law Group LLP

(57) ABSTRACT

Embodiments of the present invention provide a way of handling multiple text fields on user interfaces that are associated with relatively small screens, such as touch screen displays. Multiple text fields are presented in the same horizontal line. Contents of the currently selected text field are displayed in the horizontal line. The other text fields are indicated by a label or flag. Alternatively, the text fields may be presented in a tabbed format or with the use of pop-up windows.

17 Claims, 6 Drawing Sheets

FIG. 5

TOUCH SCREEN USER INTERFACE WITH MULTI-TEXT FIELD DISPLAY

FIELD OF THE INVENTION

The present invention is directed to user interfaces, and more specifically, to a touch screen user interface.

BACKGROUND OF THE INVENTION

Digital printing machines or copiers are widely used in offices and printing shops. To simplify their operation, a copier typically includes a touch screen that provides a user interface (UI). However, copier touch screens are generally quite small in size, which limits the amount of information provided by the UI at any one time. For example, known copier touch screens usually provide a small number of dedicated command buttons on their touch screen. Unfortunately, this UI scheme consumes a large amount of the available space on the touch screen and requires a deep hierarchy of menus and windows, which can be difficult for a user to navigate.

Accordingly, it may be desirable to provide methods, apparatus, and systems that efficiently use the available space on a touch screen. It may also be desirable to provide a UI that assists the users in navigating through the various options and commands needed to operate devices, such as copiers.

SUMMARY OF THE INVENTION

In accordance with one feature of the present invention, a method of interfacing with a touch screen comprises providing a set of text fields that may selectively occupy a horizontal space on a touch screen and sensing contact with the touch screen. A position of the probe in contact with the touch screen is determined. If the position of the probe is at one of the set of text fields, the one text field is selected. Upon selection of the one text field, that text field is expanded in the horizontal space on the touch screen for receiving information. Indicators for other text fields in the set of text fields are also provided in the same horizontal space.

In accordance with another feature of the present invention, a touch screen user interface comprises a touch screen and a user interface controller. The touch screen is configured to display a set of text fields in a horizontal space on a touch screen. The user interface controller is configured to determine a position of contact with the touch screen, determine if one of the set of text fields has been selected, and upon selection of the one text field, expanding the one text field in the horizontal space, and providing identifiers for other text fields in the set of text fields in the horizontal space.

In accordance with another feature of the present invention, a multi-function reprographic digital machine comprises a printer, a scanner, a touch screen, and a user interface controller. The touch screen is configured to display a set of selectable objects in a horizontal space. The user interface controller is configured to determine a position of contact with the touch screen, determine if one of the set of objects has been selected based on the position of contact, upon selection of one object, and expand the one object in the horizontal space for receiving information.

Additional features will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 5 depicts a screen shot diagram of an exemplary touch screen including a set of text fields in accordance with embodiments of the present invention.

DESCRIPTION OF THE EMBODIMENTS

Embodiments of the present invention provide a way of handling multiple text fields on user interfaces that are associated with relatively small screens, such as touch screen displays. Multiple text fields are presented in the same horizontal line. Contents of the currently selected text field are displayed in the horizontal line. The other text fields are indicated by a label or flag. Alternatively, the text fields may be presented in a tabbed format or with the use of pop-up windows.

Reference will now be made in detail to the exemplary embodiments of the invention, examples of which are illustrated in the accompanying drawings. Wherever possible, the same reference numbers will be used throughout the drawings to refer to the same or like parts.

Figure 1:
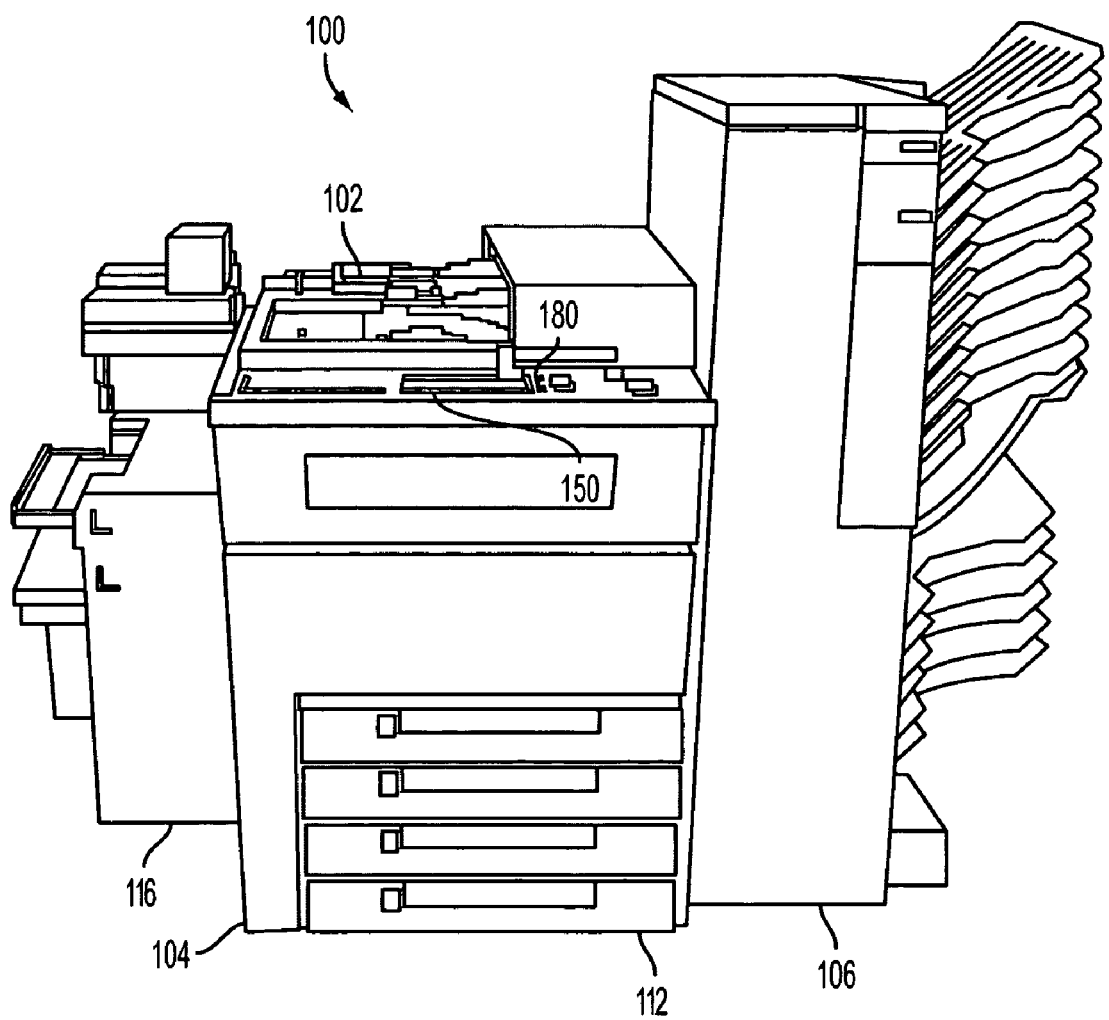
FIG. 1 depicts an exemplary digital reprographic machine that is consistent with embodiments of the present invention.

Embodiments of the present invention may be applied to a variety of devices that have a relatively small display and/or touch screen, such as a mobile phone, personal digital assistant, or digital reprographic machines, such as a copier, or a multifunction copier/scanner. For purposes of illustration, FIG. 1 depicts an exemplary digital reprographic machine 100, consistent with embodiments of the present invention. As shown, the digital machine 100 includes a scanning device 102, a printing module 104, and a touch screen user interface 150. The digital machine 100 may also include a finisher device 106 which may be a sorter, tower mailbox or stapler. The printing module 104 may include a plurality of paper trays 112 that store paper used in the printing process. The digital machine may also include a high capacity feeder 116, which is capable of holding large amounts of paper stock to be used by the machine.

In a typical scanning function, the operator would utilize the scanning device 102 to scan in the images from the original documents. This scanning device 102 may be a platen type scanner or may include a constant velocity transport system which moves the original documents across a stationary scanning device. Moreover, the scanning device 102 may also include a document handling system, which is capable of placing the original documents, automatically, on the glass platen for scanning.

With respect to the printing functions, the printing module 104 would retrieve the proper paper from one of the multiple paper trays 112 or the high capacity feeder 116, render the desired image on the retrieved paper, and output the printed image to the finishing device 106 for further operations.

Figure 2:
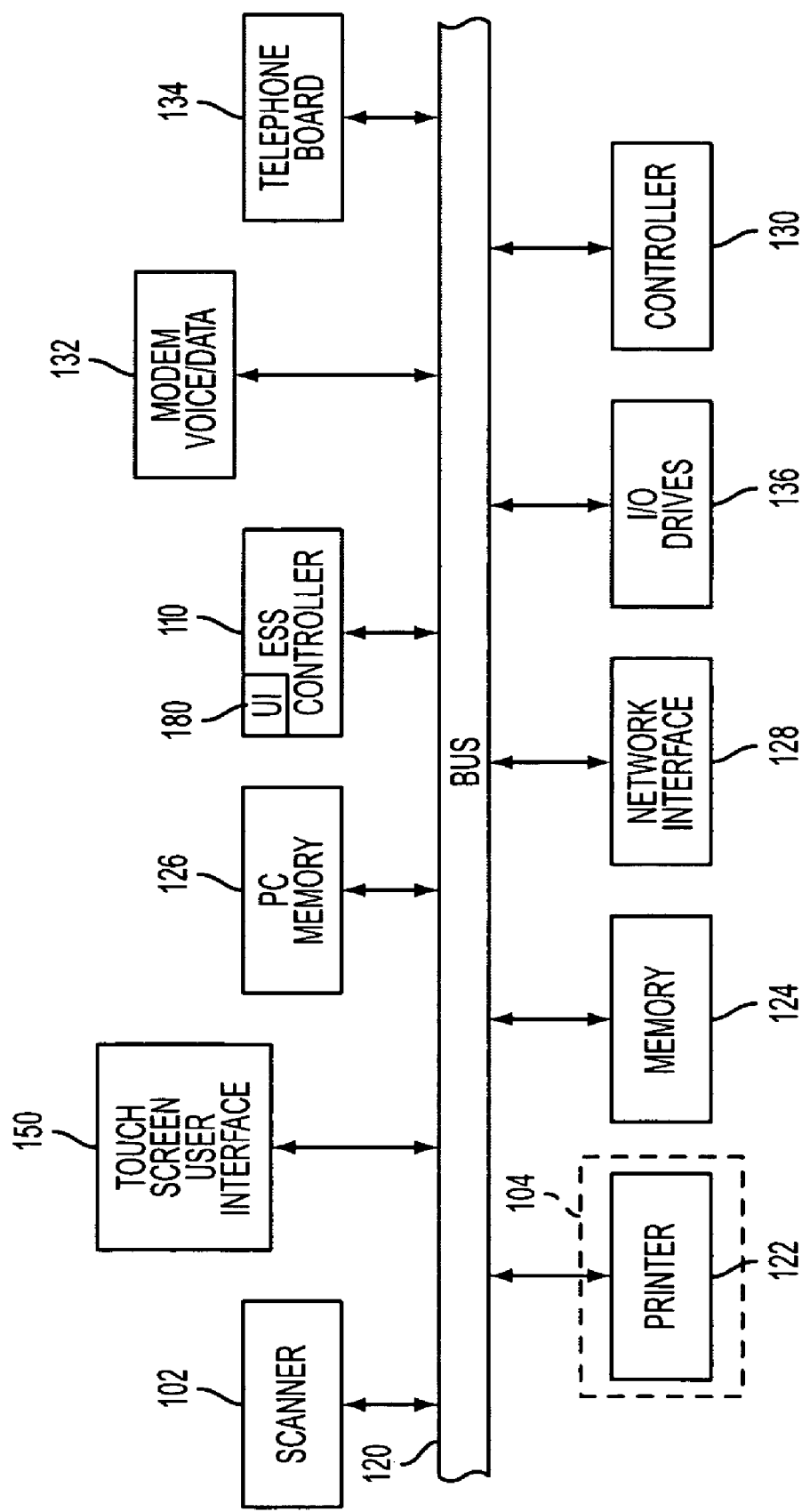
FIG. 2 depicts a block diagram of an exemplary hardware environment of the machine shown in FIG. 1 that is consistent with embodiments of the present invention.

FIG. 2 depicts a block diagram of an exemplary hardware environment of a reprographic machine 100. For purposes of illustration, machine 100 is shown comprising a scanner 102, printer 104, ESS controller 110, a memory 124, a pre-collation memory 126, a network interface 128, a network controller 130, a modem 132, a telephone board 134, I/O drives 136, touch screen 150, and a UI controller 180. These components may be coupled together via bus 120. Bus 120 may be a single bus or a plurality of buses, which provide interconnections and intercommunications between the various components of machine 100. One skilled in the art will also recognize that machine 100 may include other components.

Scanner 102 converts an original image into a set of digital signals that can be either stored or reproduced. As noted, scanner 102 may be a platen type scanner or may include a constant velocity transport system.

Printing module 104 converts digital signals representing an image into a hardcopy of that image on a recording medium, such as paper, a transparency, or other type of markable medium. Printing module 104 may further comprise a digital printing device 122 and a memory 124.

Digital printing device 122 may render the image onto the hardcopy medium. Memory 124 is provided for storing a variety of types of digital information, such as machine fault information, machine history information, digital images to be processed at a later time, instruction sets for the machine or job instruction sets.

Machine 100 may also include a pre-collation memory 126 to assist the operation of printer 102. For example, pre-collation memory 126 may store a digital representation of the image being presently rendered by the digital printing device 122. In particular, in electronic pre-collation memory 126, the digital image may already be laid out in its page structure so that it can be readily rendered by the digital printing device 122.

Electronic subsystem (ESS) controller 110 controls the functions and operations of the components shown in FIG. 2. For example, controller 110 may control the operations of scanner 102 or printer 104. A user may operate touch screen user interface 150 to enter various commands. These commands may then be passed to ESS controller 110. User interface controller 180 within ESS controller 110 may interpret the commands from user interface 150 and provide appropriate data to the other components of machine 100 via bus 120.

Since digital machine 100 may be connected to a network (not shown), it may also include network interface 128 and network controller 130. These components may control the interrelationship between the various modules or stations on the digital machine 100 and communications to/from the network (not shown). The network may be implemented as a wide area network (WAN), local area network (LAN), an intranet and/or the Internet.

Since machine 100 may be a multi-function machine, it may also include a voice/data modem 132 and/or a telephone circuit board 134. These components may be used to interface with machine 100 to a telephone network.

Machine 100 may also include additional storage, such as input/output (I/O) drives 136. I/O drives 136 may be implemented as well known devices, such as a floppy disc drive, a CD ROM drive, a tape drive, or other type of drive which can accept a portable memory device.

Figure 3:
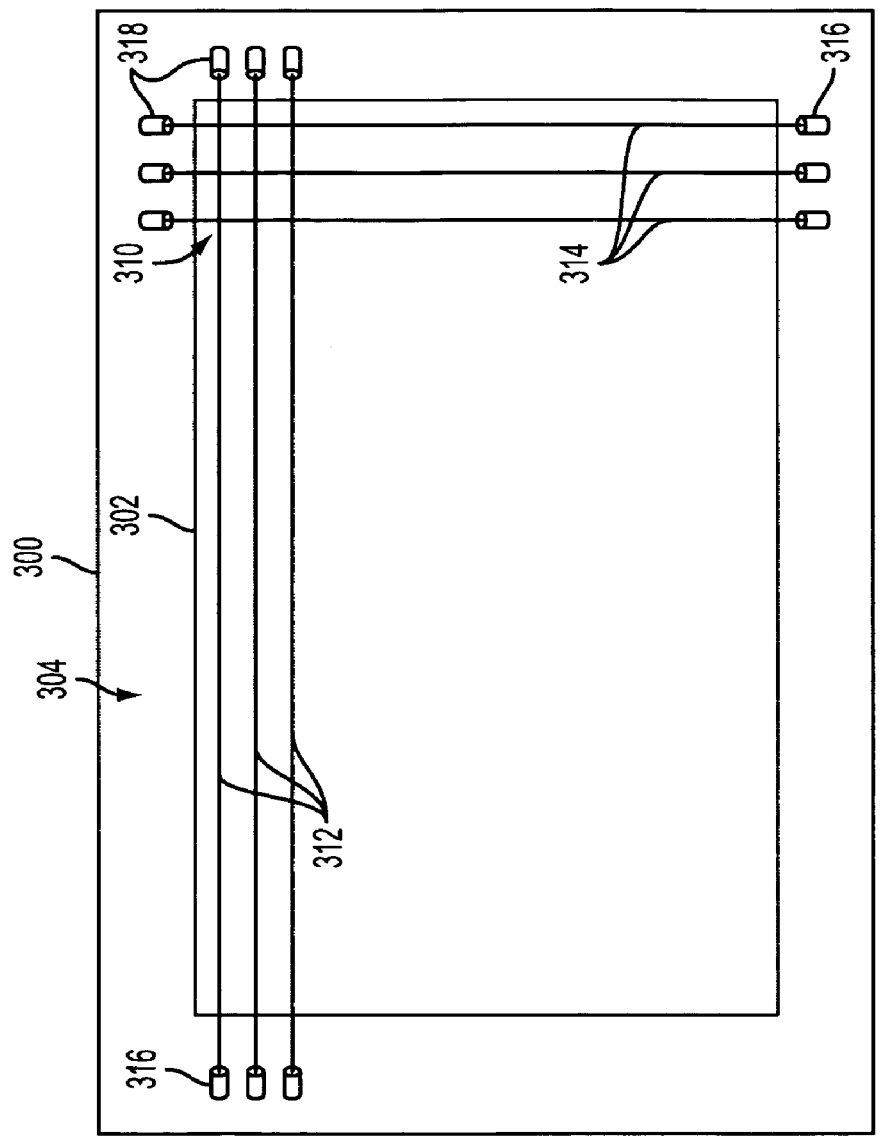
FIG. 3 depicts an exemplary structure of a touch screen that is in accordance embodiments of the present invention.

FIG. 3 depicts an exemplary structure of a touch screen for machine 100 that is in accordance embodiments of the present invention. As shown, a touch screen 300 includes a touch sensitive display 302 and a touch sensor 304. Touch sensor 304 may include an array of light sources 316 and photodetectors 318. A rectangular grid 310 is formed by the intersection of horizontal light beams 312 and vertical light beams 314. Light, in the visible or infrared spectrum, emanating from light sources 316, is directed towards photodetectors 318 located on sides opposite light sources 316. Thus, light sources 316 and photodetectors 318 may form distinct light source-photodetector pairs, hereinafter referred to as source-detector pairs.

The light beams defined by the source-detector pairs are used to detect where touch screen 300 has been touched based on the presence of a user's finger, or other such probe, in close proximity to touch screen 300. When touch screen 300 is touched, one or more light beams are interrupted and the corresponding photodetectors are unable to detect the light beam which is normally incident upon it. The lack of an incident light beam causes the photodetector to alter its output signal, thereby indicating the location of where the touch screen is being touched.

User interface controller 180 processes the photodetector signals to provide an indication that touch screen 300 has been touched, as well as the coordinate center position of where touch screen 300 has been touched. During operation, user interface controller 180 may interpret that an object on touch screen 300 has been selected when touching of touch screen 300 has ended, so that the last touched item is the selected one. In addition, when user interface controller 180 has detected touching of touch screen 300, it may provide concurrent feedback, such as a visual indicator (including, but not limited to the display of a cross-hair, arrow, or cursor-like image) or an audible indicator (including but not limited to: a simple tone, a complex tone, a musical note, a sequence of notes, a buzzer sound, a bell sound, a click sound).

Figure 4:
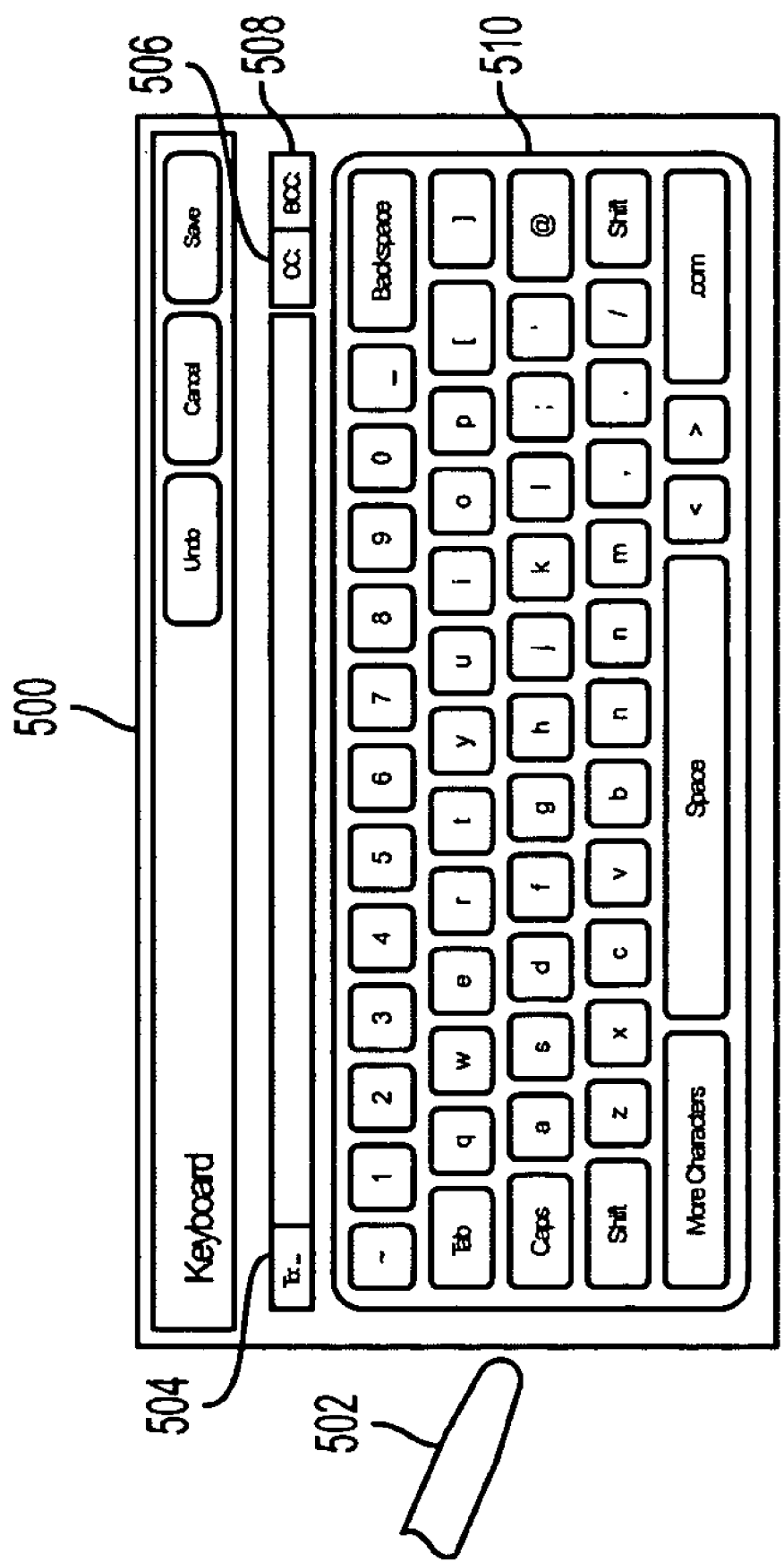
FIG. 4 depicts a screen shot diagram of an exemplary touch screen including a set of text fields in accordance with embodiments of the present invention.
Figure 5:
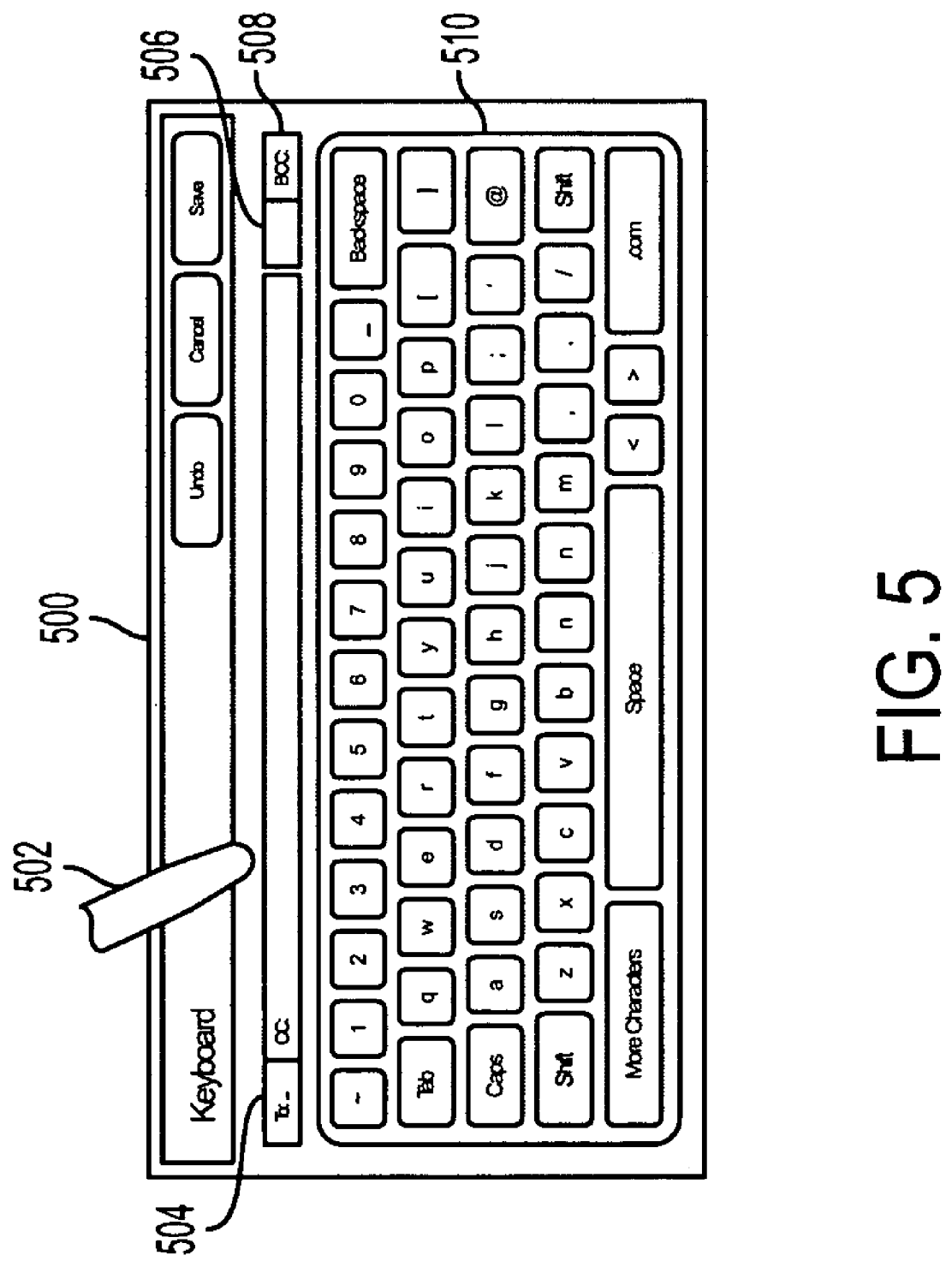

FIGS. 4 and 5 depict screen shot diagrams to illustrate the interface techniques for a touch screen display that are in accordance with embodiments of the present invention. In the examples shown, a set of objects are provided for text fields that relate to e-mail information. Accordingly, FIGS. 4 and 5 depict information fields that are typical for an e-mail, such as the address of the intended recipient of the e-mail, the address of a copy of an e-mail, and the address of a blind copy of the e-mail. In one embodiment, each text field can be identified using an identifier, such as a flag or label. For example, for the fields described above, fields for "To", "Cc", and "Bcc" are provided. Alternatively, these fields may be identified using a "tabbed" presentation or the use of pop-up windows. Other sets of fields may include fields for other well known types of user interface transactions, such as transactions for editing, formatting, and the like.

Referring now to FIG. 4, touch screen display 500 is shown with text fields 504-508. These fields have identifiers that are arranged horizontally along the same line on screen 500. Touch screen display 500 may also include an input display 510, which allows a user to input information into each text field 504-508. Of course, the user may enter information by other mechanisms, such as a keyboard, and the like.

In the example shown, input display 510 is a touch keypad that emulates a keyboard. Accordingly, input display 510 is made up of a set of objects corresponding to alpha-numeric characters or functions relating to manipulating alpha-numeric characters such as those characters and functions found on a standard keyboard. A user can input information using the touch keypad 510 by touching display 500 with their finger or using a probe or stylus 502.

In order to enter desired information, a user can select one of text fields 504-508. As depicted in FIG. 4, upon selection of text field 504, it may be expanded to permit the user to enter information for that field. When text field 504 is expanded, identifiers for text fields 506 and 508 are shown in a contracted form along the same horizontal line as text field 504. A user can input information into text field 504 using keypad 510 as described above. If the user can selects another text field 506-508, then display 500 may be updated to reflect this selection.

For example, as depicted in FIG. 5, once a user selects another text field such as text field 506, text field 504 is contracted and text field 506 is expanded. However, identifiers for text field 504 and 508 may still be provided in contracted form as shown in FIG. 5. In addition, if text field 504 includes information when it is contracted, in one embodiment, touch screen 500 displays a signal such as, for example, one or more ellipses with the identifier for text field 504. Of course, other signals or indicators may be used to indicate text has been entered in a text field, such as various icons, different colors, and the like.

Figure 6:
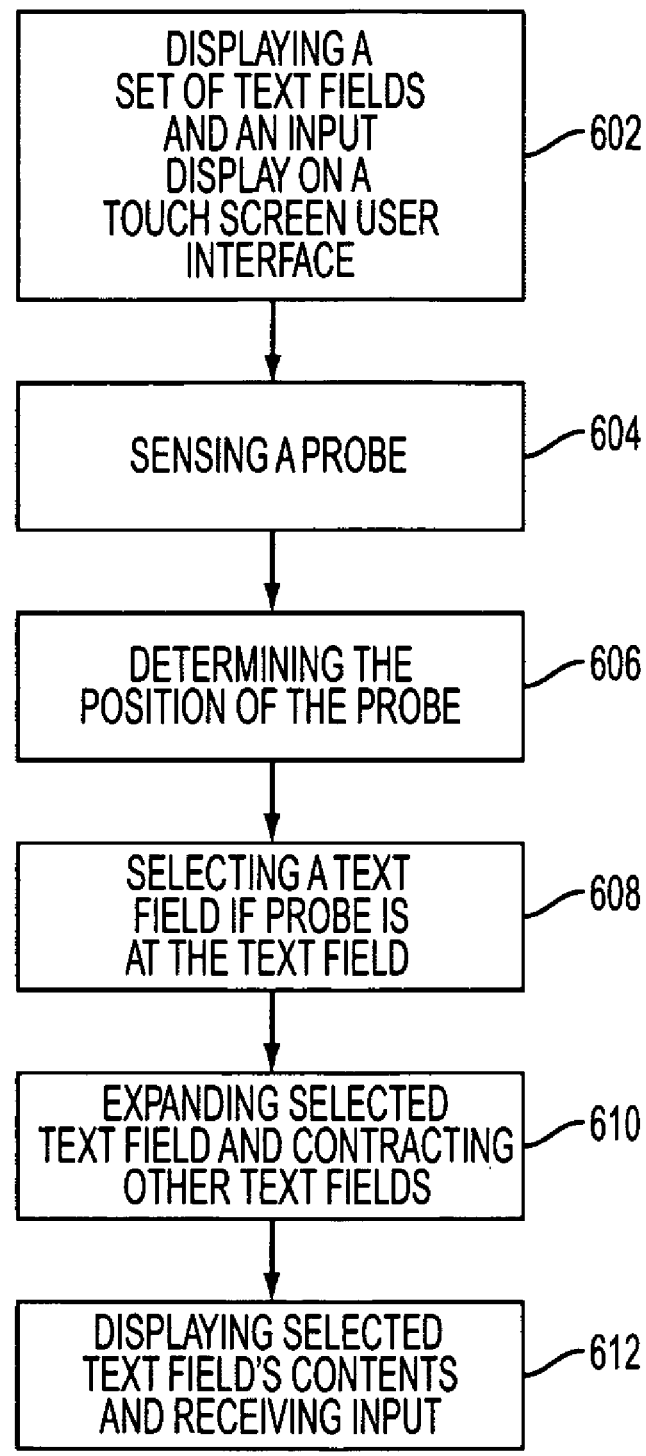
FIG. 6 depicts a flow diagram of an exemplary user interface control process in accordance with embodiments of the present invention.

FIG. 6 depicts a flow diagram of an exemplary user interface control process that is consistent with embodiments of the present invention. For purposes of explanation, the flow diagram will be described with reference to the embodiment of the system depicted in FIGS. 1 and 2, i.e., a user interface using a touch screen on a digital reprographic system.

First, user interface controller 180 displays (step 602) a set of text fields, such as text fields 504, 506, and 508, and an input display such as touch keyboard 510 on touch screen user interface 150. In one embodiment, the set of text fields are displayed horizontally along the same line. The user may use a finger or a probe to touch the touch screen user interface 150 and user interface controller 180 senses (step 604) the probe.

User interface controller may determine (step 606) the position of the probe based on a signal or signals from touch sensor 304. If the position of the probe is at a text field, user interface controller 180 selects (step 608) the text field. Upon selection of the text field, user interface controller 180 expands the selected text field on display 500 and contracts the other text fields (step 610), for example, as described above in FIGS. 4 and 5. Upon expanding the text field, user interface controller 180 displays its contents and receives input from a user (step 612). In one embodiment, user interface controller 180 expands the selected text field and contracts the other text fields gradually so the user can see the selected text field and its contents gradually expand while the other text fields gradually contract. This input can be provided by the user through an input display, such as touch keypad 510, or external keyboard (not shown).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of interfacing with a touch screen comprising:
   providing a set of text fields and a fixed center area that selectively occupy a horizontal space on a touch screen, the center area being fixed relative to the touch screen;
   sensing contact with the touch screen;
   determining a position of a probe in contact with the touch screen;
   if the position of the probe is at one of the set of text fields, selecting the one text field;
   upon selection of the one text field, expanding the one text field to fully occupy the center area in the horizontal space on the touch screen for receiving information and providing indicators for other text fields in the set of text fields in the same horizontal space; and
   upon selection of a second text field different from the one text field, contracting all text fields in the set of text fields except for the second text field from the center area, and expanding the second text field to fully occupy the center area for receiving information.

2. The method of claim 1 further comprising displaying a touch keypad for inputting information into the set of text fields.

3. The method of claim 1 further comprising displaying an identifier associated with each one of the set of text fields.

4. The method of claim 1 wherein the information is an e-mail address.

5. The method of claim 4 further comprising displaying a signal to indicate that a text field includes information.

6. The method of claim 5 wherein the signal is an ellipses.

7. The method of claim 5 wherein the signal is a color.

8. The method of claim 3 wherein the one text field is contracted gradually and the second text field is expanded gradually such that a user can see the one text field contracting and the another one text field expanding.

9. A touch screen user interface comprising:
   a touch screen configured to display a set of text fields and a fixed center area in a horizontal space on a touch screen, the center area being fixed relative to the touch screen; and
   a user interface controller configured to
       determine a position of contact with the touch screen,
       determine if one of the set of text fields has been selected,
       upon selection of the one text field, expand the one text field to fully occupy the center area in the horizontal space and provide identifiers for other text fields in the set of text fields in the horizontal space, and
       upon selection of a second text field different from the one text field, contracting all text fields in the set of text fields except for the second text field from the center area, and expanding the second text field to fully occupy the center area for receiving information.

10. The touch screen user interface of claim 9 wherein the touch screen displays a touch keypad for inputting information into the set of text fields.

11. The touch screen user interface of claim 9 wherein the information is an e-mail address.

12. The touch screen user interface of claim 9 wherein the touch screen displays a signal to indicate that a text field includes information.

13. The touch screen user interface of claim 12 wherein the signal is an ellipses.

14. The touch screen user interface of claim 9 wherein the one text field is contracted gradually and the second text field is expanded gradually such that a user can see the one text field contracting and the another one text field expanding.

15. A multi-function reprographic digital machine comprising:
   a printer;
   a scanner;
   a touch screen configured to display a set of selectable text fields and a fixed center area in a horizontal space, the center area being fixed relative to the touch screen; and
   a user interface controller configured to determine a position of contact with the touch screen, determine if one of the set of text fields has been selected based on the position of contact, upon selection of one text field, expand the one text field to fully occupy the center area in the horizontal space for receiving information, and upon selection of a second text field different from the one text field, contracting all text fields in the set of text fields except for the second text field from the center area, and expanding the second text field to fully occupy the center area for receiving information.

16. The machine of claim 15 wherein the user interface controller is configured to display an identifier for each text field in the horizontal space on the touch screen.

17. The machine of claim 16 wherein the user interface controller is configured to modify the identifier for each text field when information has been received for that text field.

* * * * *